INVENTORS
ROGER D. ECK
AND GEORGE D. LIPP

BY Clarence R. Patty, Jr.
ATTORNEY

United States Patent Office 3,245,769
Patented Apr. 12, 1966

3,245,769
METHOD OF INTRODUCING MATERIAL INTO MOLTEN GLASS
Roger D. Eck, East Aurora, and George D. Lipp, Corning, N.Y., assignors to Corning Glass Works, Corning, N.Y., a corporation of New York
Filed Oct. 25, 1962, Ser. No. 232,926
4 Claims. (Cl. 65—27)

This invention relates to the introduction of solid fill into a molten bath, and more particularly to an improved method of introducing and uniformly distributing solid batch material within the molten bath of a glass tank which eliminates the problems of segregation and dusting, inherent with conventional feeders.

In the past, it has been customary to introduce fill in powdered or granular form into the fill or charging end of a glass furnace by means of a blanket or screw feeder. Both of these conventional feeders not only produce loose batch piles adjacent the feeding end of the furnace, but also cause a considerable amount of dusting. Such dusting is not only extremely detrimental to the health of the furnace personnel, due to a silicosis problem, but also results in the loss of a measurable portion of the batch, as fines are drawn up through the stack.

Segregation has been a further problem encountered with the known types of batch feeders. The batch has a tendency to segregate as it falls into the tank, thus producing inhomogeneous cords. Also, the introduction of such solid batch material has a tendency to thermally shock the molten bath, and due to the low solution rates accompanying such feeding, both cord and stone are likely to be produced.

The instant invention obviates all of the heretofore enumerated disadvantages and problems inherent with the conventional types of heaters. Basically, our improved method includes the continuous application of granular or powdered batch to a continuously moving body of glass in a molten or plastic condition so that the batch is uniformly distributed within and/or fused onto the continuously moving glass body. The continuously moving hot glass body containing the batch material is directed into the melting end of the glass tank wherein it readily fuses and uniformly distributes the batch material into the melt.

It thus has been an object of our invention to provide an improved method of introducing solid batch material into a glass tank for facilitating melting and producing homogeneous glass.

A further object of our invention has been to provide an improved method of introducing batch into a glass tank which obviates the problems of segregation and dusting, inherent with the now known methods.

These and other objects of our invention will be more apparent to those skilled in the art from the following disclosure and accompanying drawings in which.

Figure 1:
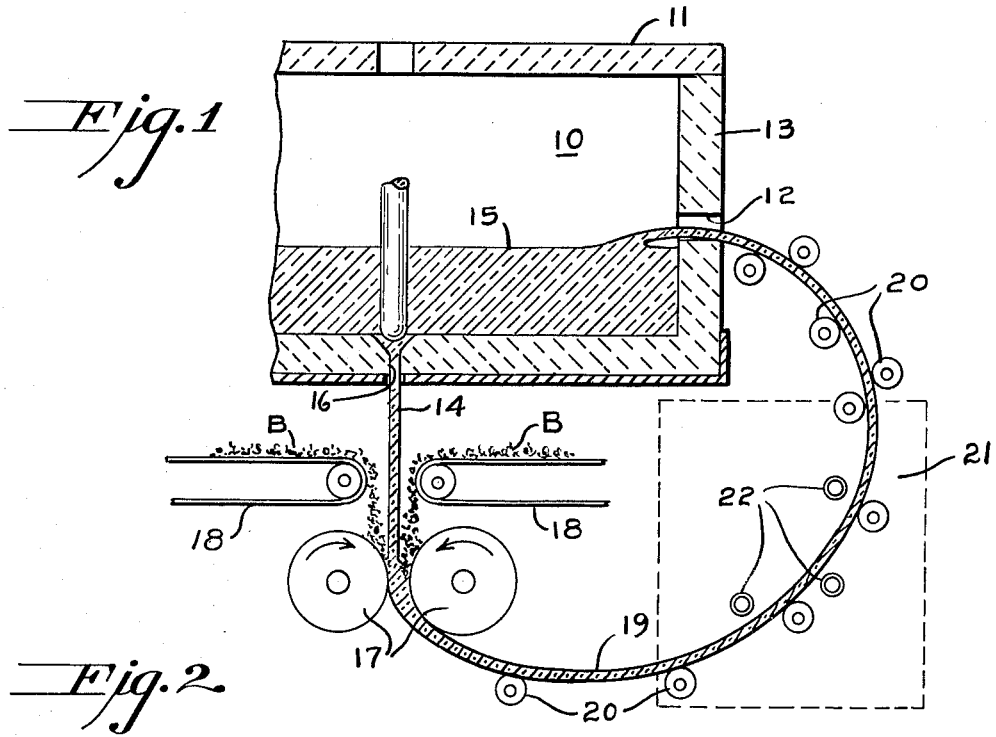
FIGURE 1 is a schematic side elevational view, partially in section, illustrating a process embodying our invention.

Referring now to FIGURE 1, the melting end 10 of a glass tank 11 is shown having a feed opening 12 in an end wall 13. Molten glass 14 from a bath 15 contained within the tank is delivered from a tap 16 to the bite of a pair of cooperable rollers 17. Batch material B is continuously fed to the bite of the rollers 17 on opposite sides of the stream 14 by any suitable means such as conveyors 18. The batch-impregnated glass 19 is then continuously fed along a series of guide rolls 20 through the feed opening 12 and into the tank 10 wherein it homogeneously fuses with the molten bath 15.

A heating zone, schematically shown at 21, is provided to control the temperature of the continuously moving batch-impregnated glass body 19, which may be in the form of sheet or ribbon, so as to maintain the ribbon in a reasonably flexible or plastic condition. In addition, the heating zone functions to preheat the film prior to its introduction into the glass tank to thereby avoid thermal shock and facilitate ready fusion. A plurality of burners 22 are positioned within the heating zone 21 to impart the necessary heat to the batch-impregnated body 19.

Figure 2:
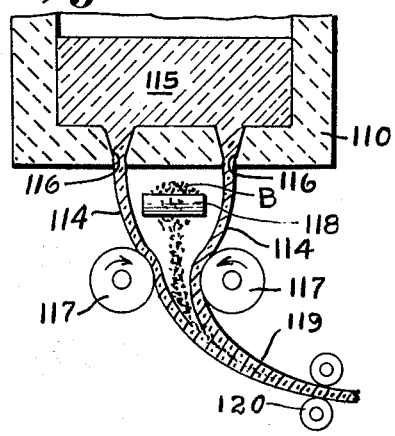
FIGURE 2 is a fragmental schematic illustration of a further embodiment of our invention based upon the principles shown in FIGURE 1.

FIGURE 2 illustrates a method similar to that shown in FIGURE 1 with the exception that the batch material is sandwiched between or fused within a continuously moving body of glass. As shown in the fragmental schematic illustration of FIGURE 2 the tank 110 containing a bath 115 of molten glass is provided with a pair of outlets 116. A pair of streams 114 of molten glass are delivered from the outlets 116 to a pair of cooperable rollers 117. Batch B is delivered by any suitable means such as conveyor 118 to the bite of the cooperable rollers 117 between the streams 114 so as to be sandwiched or fused therewithin. The continuous batch-impregnated glass body 119 is directed by means of guide rollers 120 through a heating zone and into a glass tank in a manner similar to that shown in FIGURE 1. The molten glass used to form the continuously moving batch impregnated body may be tapped from any suitable source such as the melting zone, fining zone, forehearth, or cullet chute.

Figure 3:
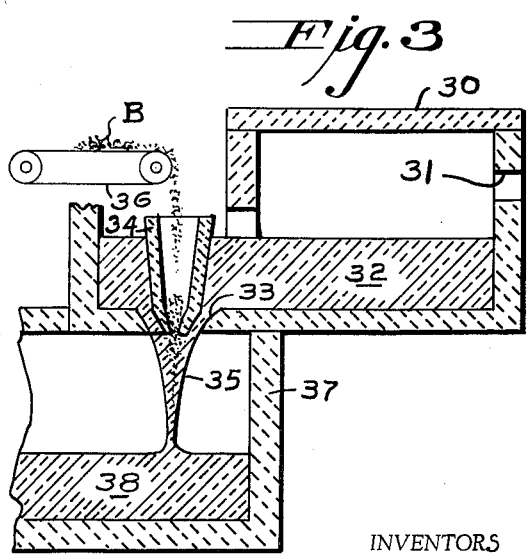
FIGURE 3 is a schematic side elevational view in section illustrating a further embodiment of our invention.

FIGURE 3 represents a further embodiment of our invention wherein molten glass from a premelter is fed into a glass melting tank in a somewhat tubular form with granular batch entrapped therewithin. As shown, a separate melting tank 30 such as a premelter for cullet, has a feed opening 31 and contains a bath of molten glass 32. Molten glass from the bath 32 is discharged through an orifice 33 supplied with a hollow mandrel 34 thus forming a hollow tubular stream 35. Granular or powdered batch B is delivered by any suitable means such as conveyor 36 to the interior of the hollow mandrel 34 so that it is continuously supplied to the interior of the hollow stream 35.

As the hollow stream 35 flows downwardly, the batch becomes entrapped therewithin due to the normal attenuation of the stream during its downward fall. The tubular stream containing the batch therewithin is fed into a glass melting tank 37 containing a molten bath 38. The batch impregnated glass body or stream is readily disseminated within the bath 38 thus producing homogeneous glass. In addition, not only is thermal shock obviated due to the application of heat to stream 35 from tank 37, but also faster solution rates accompany this type of feeding which facilitate the elimination of cord and stone.

It thus can be seen from the foregoing representative examples that our invention encompasses a novel method of feeding batch to a glass furnace which facilitates the production of homogeneous glass. In operation, molten glass is delivered from any suitable source and granular or powdered batch is continuously supplied thereto so as to be impregnated within the glass or fused on its surface. The glass body containing the batch is fed into the bath of a glass tank while at a temperature which maintains the glass body in semi-molten or plastic condition. Due to the temperature of the glass body at the point of introduction, faster solution rates are obtained which facilitate elimination of cord and stones. In addition, dusting, segregation, thermal shock, and feeder screw or piston ware contamination are eliminated. The invention also presents a useful recycle system for cullet and tap-off glass. For example, the hot plastic cullet strip produced by the Corning Bulb Machine may be supplied with granular batch material and passed through a pair of cooperable rolls to insure the adhesion thereof, and then directed back into the glass melting tank.

Although we have disclosed our now preferred embodiments of the instant invention, it will be apparent to those skilled in the art that various changes and modifications may be made thereto without departing from the spirit and scope thereof as defined in the appended claims.

What is claimed is:

1. A method of continuously introducing batch material into the molten bath of a glass melting tank which comprises, removing molten material from a source thereof, directing the removed material toward the bite of a pair of cooperable rollers, supplying batch material to the bite of such rolls, initially combining the batch material with such removed material adjacent the bite of such rolls, roll forming a strip of such combined materials, maintaining such strip in a plastic condition, and delivering such strip to the molten bath of the melting tank.

2. A method of continuously introducing batch into the molten bath of a glass melting tank which comprises, tapping molten glass from such melting tank, directing such molten glass to a bite of a pair of forming rolls, continuously supplying granular batch material separately of such molten glass to the bite of such rolls, roll forming a continuous sheet of batch impregnated glass at the bite of such rolls, passing such sheet through a heating zone to maintain the sheet in a plastic condition, and directing such sheet into the molten bath of the melting tank.

3. An improved method of introducing batch material into a glass tank to eliminate dusting and segregation and facilitate homogeneous melting which comprises, tapping molten glass from the tank and directing the stream of such glass toward the bite of a pair of cooperable forming rolls, continuously supplying granular batch material to the bite of such forming rolls on opposite sides of such stream, initially combining the glass stream and granular batch material adjacent the bite of such rolls and continuously forming glass sheet having batch material sintered to opposite surfaces thereof, maintaining such sheet at an elevated temperature, and directing such sheet back into the molten bath of the melting tank.

4. An improved mehod for introducing batch material into a glass melting tank which comprises, tapping a plurality of streams of molten glass from a bath contained within a glass melting tank, directing such streams to a pair of forming rolls, continuously supplying batch material to the bite of such rolls between the plurality of streams, combining such streams and batch material at the bite of such rolls and continuously forming a batch impregnated sheet of glass, maintaining such sheet at an elevated temperature, and redirecting such sheet back into the molten bath contained within the glass melting tank.

References Cited by the Examiner

UNITED STATES PATENTS 2,371,213   3/1945   Batchell _____ 65—335
3,047,409   7/1962   Slayter et al. _____ 65—60

DONALL H. SYLVESTER, *Primary Examiner.*

A. D. KELLOGG, *Assistant Examiner.*